Oct. 23, 1956     J. A. BRENNER     2,768,007
WELL CASING HEAD OR CAP AND PIPE CLAMP
Filed Sept. 4, 1953     2 Sheets-Sheet 1
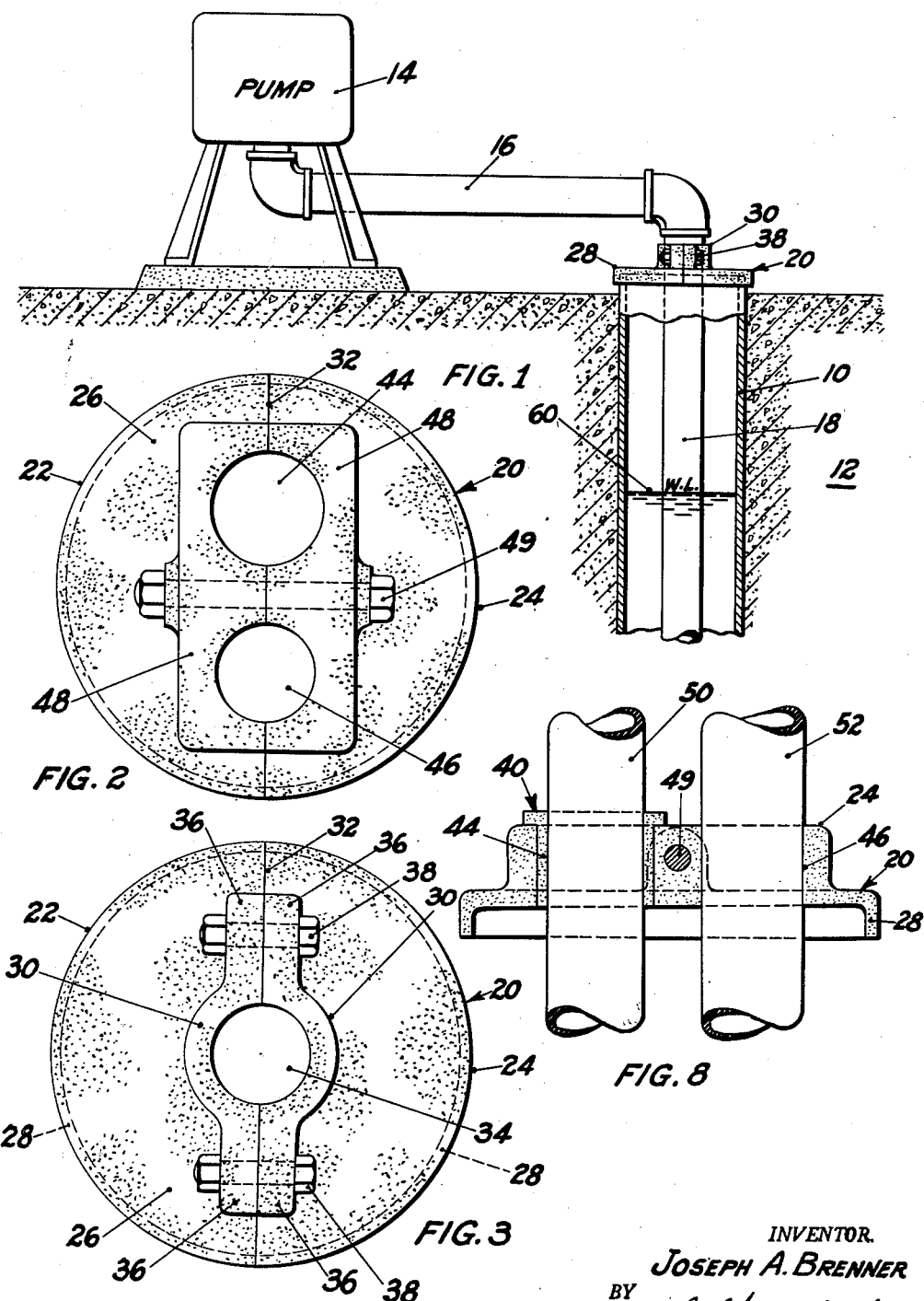
INVENTOR.
JOSEPH A. BRENNER
BY
ATTORNEY

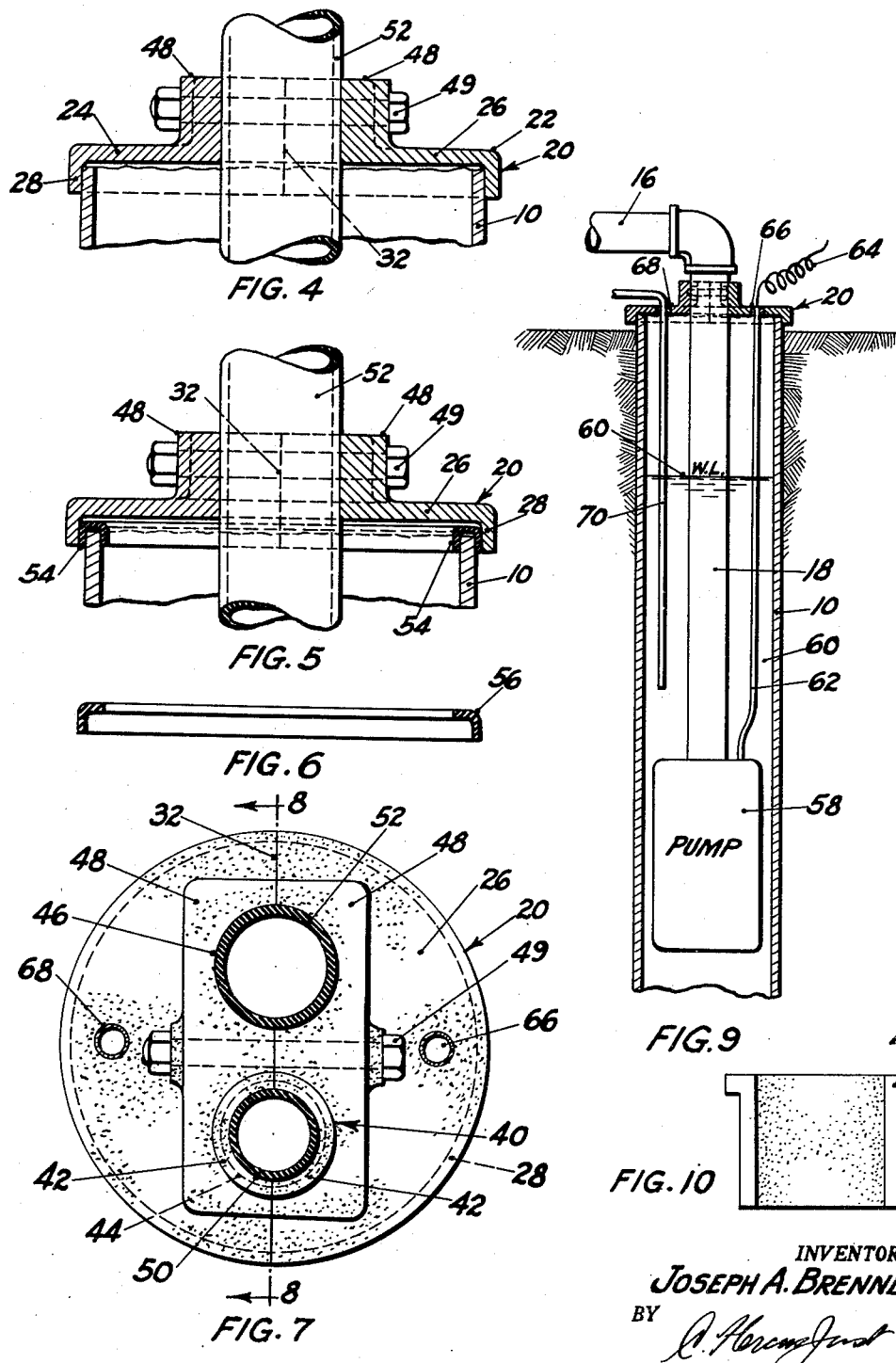

United States Patent Office 2,768,007
Patented Oct. 23, 1956

2,768,007
WELL CASING HEAD OR CAP AND PIPE CLAMP

Joseph A. Brenner, Hanover, Pa.

Application September 4, 1953, Serial No. 378,628

2 Claims. (Cl. 285—140)

This invention relates to a combination well casing head and pipe clamp particularly adapted for use on the casings for water wells but it is to be understood that its use is not restricted entirely to such wells inasmuch as said head may be used on the casings on other types of wells.

Well casings usually project a short distance above the top of a well so as to extend either slightly above the ground surrounding a well or above the bottom of a pit which may be formed around the top of a well casing. Providing a suitable head or cap for such well casings so as to accommodate one or more pipes extending into the well casing has long presented a problem in regard to anchoring suitably said pipes relative to the head or cap. Heretofore, numerous types of heads have been used employing various kinds of clamps, couplings, wedges and the like for purposes of holding one or more well pipes in fixed relationship to the head and the well casing. Many presently used well casing heads are relatively expensive to manufacture and are complicated to install. The weight of the pipes extending into the well casing frequently is considerable and it usually is difficult to hold such pipes in desired relationship to the well casing while such pipe or pipes are being locked or clamped in operative position by the casing head relative to the well casing and the pump. In many instances, several men are required to effect such locking or clamping of the well pipes and presently used heads, in the main, do not lend themselves to easy or ready manipulation for purposes of fixing or clamping the well pipe or pipes relative to the head and well casing.

Recently, so-called plastic pipe has become rather widely used in wells of various kinds. This type of pipe is desirable in that it readily resists corrosion and is lighter in weight than conventional metal pipe used heretofore. Most types of plastic pipe are formed at least partially from synthetic resin and one commonly used type of resin is polyethylene. This resin affords a substantial amount of pliability and compressability in pipes formed therefrom and these properties are permanent over long periods of time. Such pipe or tubing is sufficiently pliable that it may be shipped in coils of suitable diameter. However, the use of these pipes in wells and particularly water wells has presented many problems in regard to anchoring or locking the pipe in fixed relationship to the well casing as well as the pump. Many new types of connecting means have had to be devised in regard to well installations using such plastic pipe inasmuch as the light weight and compressible nature of the plastic pipe has had to be taken into consideration, especially where the principal resin used in the pipe is polyethylene. Thus, new types of pipe couplings, elbows, and the like have been devised to render such pipe adaptable for use in wells and other installations. Thus far, no simple and effective well casing head has been devised for purposes of clamping and supporting such plastic pipe in operative relationship to a well casing and pump.

It is the principal object of the present invention to provide a combined well casing and pipe clamp which is simple and inexpensive to produce and is adapted to securely clamp and support either metal or plastic pipe in fixed relationship relative to a well casing and pump.

It is a further object of the invention to provide a combination well casing head and pipe clamp which is formed of a plurality of preferably segmental sections having one or more holes therein to accommodate a well pipe or pipes of standard size, said holes in the head being slightly smaller in diameter than the outer diameters of the pipes to be accommodated within said holes, whereby when said sections of the head are clamped in operative position, the surfaces defining the hole or holes in said head will firmly engage the outer surfaces of the pipe or pipes and immovably hold the same in fixed relationship to the head and well casing, as well as the pump, under normal conditions of use.

As a corollary to the foregoing object, it is still a further object, in the preferred embodiment of the invention, to make the surfaces defining the pipe receiving holes somewhat roughened so as to effect firm gripping of slightly compressible plastic pipe and, if a hard surfaced pipe such as bronze, copper, or galvanized iron is to be clamped by the casing head, the small protuberances of the roughened surfaces will be somewhat flattened or compressed when the sections of the casing head are clamped in operative position, thereby firmly conforming the hole defining surfaces to the outer surfaces of the pipe being clamped thereby.

It is another object of the invention to provide a combination well casing head and pipe clamp which is of such nature that, with the use of a few different sizes of adapter bushings, a very limited number of casing heads embodying the present invention need be kept in stock by a plumber or well contractor, yet said heads will accommodate a relatively wide number of different conventional sizes of well pipes.

A still further object of the invention is to provide a flange on the perimeter of the casing head which will surround a portion of the upper end of a well casing and thus implement the positioning of the casing head relative to the well casing.

It is common practice in the installation of wells at present to drive a well casing into the ground as the well is drilled and various lengths of said casing will project above the well installation at the completion of the drilling operation. If an undesired amount of the casing projects above the ground or the base of a well pit, it is common practice to cut off the excess amount by a cutting torch which leaves a somewhat roughened surface on the upper end of the well casing on which the casing head is to rest. This rough upper end of the well casing is sometimes detrimental when inserting well pipe into the casing and, particularly, plastic well pipe. The latter type of pipe is relatively expensive and in order to minimize or eliminate possible damage to plastic pipe, particularly while inserting it in the well casing, it is still another object of the invention to provide a protective and sealing gasket which will be disposed on said rough upper end of the well casing prior to inserting the well pipe into the casing. In the preferred embodiment of the invention, said gasket is of a compressible nature and formed from a suitable rubber composition, for example. The gasket is also thicker than the space between the outer surface of the well casing and the inner surface of the projecting flange on the casing head embodying the principles of the present invention, whereby when the sections of said casing head are clamped firmly in operative position, the protective and sealing gasket will be compressed to provide a tight seal between the casing head and well casing, simultaneously with clamping a well pipe or pipes relative to the casing head and well casing.

Still another object of the invention is to provide on said combined well casing head and pipe clamp suitable bosses through which extend the holes which receive the well pipe or pipes and one or more holes of suitable diameter are provided in said boss so as to extend transversely thereto for receiving clamping bolts, the latter preferably providing the only locking means which are necessary to secure the sections of the well casing head in operative position, thereby rendering the casing head very easy to manipulate while applying it to a well casing and clamping the well pipes in desired position with said casing and the pump.

One further object of the invention is to provide a composite well casing head and pipe clamp composed of a plurality of sections which preferably are identical and therefore capable of inexpensive manufacturing by molding or casting all sections of a head of specified size within a single mold cavity from suitable material including either slightly compressible metal or suitable synthetic resin as will be described in detail hereinafter.

Details of the foregoing objects and of the invention as well as other objects thereof, are set forth in the following specification and illustrated in the accompanying drawings comprising a part thereof.

In the drawings:

Fig. 1 is a side elevation of an exemplary well casing and pump installation embodying the principles of the present invention, the well casing being shown partly in section.

Fig. 2 is a top plan view of one embodiment of a combined well casing head and pipe clamp per se incorporating the principles of the present invention.

Fig. 3 is a top plan view of another embodiment of combined well casing head and pipe clamp per se incorporating the principles of the present invention.

Fig. 4 is a fragmentary vertical sectional view of the upper end of a well casing showing the roughened upper end of said well casing and the manner in which the well casing head and pipe clamp engages the same when no gasket is used.

Fig. 5 is a very similar view to Fig. 4 but showing the installation when one embodiment of sealing gasket is used on the upper end of said well casing.

Fig. 6 is a vertical sectional view of another embodiment of sealing gasket per se.

Fig. 7 is a top plan view of another embodiment of combined well casing head and pipe clamp, similar to that shown in Fig. 2, but utilizing an adaptor bushing in one of the well pipe holes provided in the casing head.

Fig. 8 is a sectional view taken on the line 8—8 of Fig. 7.

Fig. 9 is another exemplary illustration, in vertical section, of a well installation embodying the principles of the present invention and showing a submerged pump in the well.

Fig. 10 is a front view of one section of bushing used in one embodiment of the invention.

Referring to the drawings, Fig. 1 illustrates an exemplary installation of one type of well in which a well casing 10 extends into the ground 12 and projects slightly above the ground level at its upper end. A pump 14 is mounted in fixed position relative to the well and a lateral or offset pipe 16 connects the pump with the upper end of a well pipe 18. A combined well casing head or cap and pipe clamp 20 surrounds the upper end of well pipe 18 and engages the upper end of well casing 10.

In the installation shown in Fig. 1, only a single well pipe 18 is used. In such installation, a casing head 20, such as is illustrated in detail in Fig. 3, is employed. Said head comprises a plurality of sections 22 and 24 which preferably are identical and therefore are capable of being molded or cast in the same mold or die. The head 20 essentially constitutes a head unit comprising a disk-like cover 26, from one surface of which an annular flange 28 extends, and preferably is integral with the disk-like cover 26. Also integral with said cover 26 is a boss 30 which projects upward from the casing head when in operative position, said boss projecting from the surface of the disk-like cover 26 opposite to that from which the flange 28 depends.

From Fig. 3, it will be seen that the casing head or cap 20 is bisected along the line 32, said line being defined by the abutting or meeting surfaces of the sections 22 and 24 of the casing head unit. Each of said sections of the casing head has a boss 30 thereon and the bosses of the several sections of casing head cooperate and are complementary to form a united and transversely elongated boss having a hole 34 which extends through the boss as well as the disk-like cover 26 of the casing head, each section of the casing head having part of said hole therein. The bosses 30 are provided with wings 36 which are apertured transversely to receive clamping bolts 38. Said bolts preferably comprise the only means to secure the sections 22 and 24 of this embodiment of the casing head in clamping and operative position.

The hole 34 formed between bosses 30 of the several sections of the casing head has a diameter or transverse dimension slightly less than the outer diameter or transverse dimension of a pipe to be received within said hole. For example, the usual size of pipes normally used in water wells are 1" to 1¼" and 1½", all dimensions being the inner diameters of the pipes. The outer diameter of a 1¼" conventional plastic pipe is 1.66". Therefore, for example, if the hole 34 in a specified casing head is to accommodate a 1¼" plastic pipe, the diameter of the hole 34 preferably is approximately from .005" to .008" less than said outer diameter of the pipe to be received within said hole. This decrease in the diameter of the hole 34 is adequate to afford very firm clamping of plastic, slightly compressible, pipe within the hole 34. Especially when the plastic pipe is composed principally of polyethylene, the amount of squeezing required to accommodate it in the hole 34 will be permitted readily by the pipe without rupture or fracture and inasmuch as the length of the hole 34 is substantially greater than the thickness of the disc-like cover 26, a very substantial area or frictional contact with the pipe is afforded. Further, the sections 24 and 26 of the head or cap are provided with a very slight draft on all sides to facilitate removal of said sections from the mold. This draft, though slight, operates to advantage relative to the hole 34 in providing a slight taper which slopes downward and inward toward the axis of the hole when the head is in operative position. Such arrangement also facilitates gripping the pipe by the walls of hole 34.

It is contemplated that possibly several sizes of casing heads will be required to accommodate the usual range of pipes used in water wells. Regarding the single pipe style of casing head shown in Fig. 3, heads respectively having holes to accommodate 1" pipe and 1½" pipe could be carried in stock. Such heads would respectively accommodate the sizes of pipes intended to be mounted therein. Then, if 1¼" pipe was to be used in a specified installation, an adaptor bushing 40, shown in Figs. 7 and 8 and comprising identical complementary sections 42, may be employed in a casing head intended normally to accommodate a pipe of 1½" size. The outer diameter of the bushing 40 comprising two sections 42 preferably is between .002" and .004" greater than the diameter of the hole 34 in the casing head 20. The diameter of the hole within the bushing 40 preferably is between .005" and .008" less than that of the pipe to be accommodated within the bushings. Thus, it will be seen that a simple and inexpensive bushing 40 may be used, for example, within a casing head having a hole 34 for 1½" pipe for purposes of adapting a 1¼" pipe to said head. The sections of the bushing 40 are identical and preferably are molded or cast from material similar to the casing head 20 and also have a slight draft similar to that of hole 34, as described above.

The sections 22 and 24 of the casing head 20 preferably are formed from a suitable relatively soft, slightly compressible, metal of the class including aluminum, white metal, bronze and copper. The same applies to the sections 42 of bushing 40. Said sections may inexpensively and quickly be formed by casting or molding in said molds. Since the complementary sections meet on radially extending lines, it will be seen that the sections may be made identical to each other and therefore all sections may be formed in a common mold, it being understood of course that each casing head or bushing to accommodate a specified size of pipe will be different from a casing head or bushing to accommodate another size of pipe. However, for a specified size of pipe, all casing head sections and bushing sections will be identical.

Casting said sections in a sand mold will provide a slightly roughened or dimpled type of surface on the casting but such formation is advantageous particularly on the surfaces defining the hole 34 and the bushing sections so as to provide a great many small protuberances. These protuberances, when engaging plastic pipe, will provide a highly frictional engagement between the casing head or bushing and the pipe. When metal pipe and particularly galvanized iron pipe is to be accommodated within the hole 34, such protuberances will be compressed or flattened when the sections 22 and 24 are tightened by the bolts 38 into clamping relationship with each other or against the bushing sections. Therefore, notwithstanding the slightly smaller diameter of the hole 34 or bushing relative to the metal pipe disposed therein, the abutting surfaces of the head sections 22 and 24 may be clamped into firm abutting relationship by the bolts 38 due to the flattening action of the protuberances on the surfaces defining the hole 34 and bushing sections. Except for the sand finish however, the interiors of the bushing 42 and hole 34 are generally smoothly cylindrical. In the preferred embodiment of the invention, the abutting surfaces of the sections 22 and 24 and the bushing sections are machined, ground, or buffed to smooth condition, thereby removing more or less of the surfaces thereon initially formed by the molding operation and a suitable amount of excess material is provided on these sections to afford such machining or grinding.

It is also contemplated within the purview of the present invention that the sections of the casing head 20 may be formed from suitable, preferably rigid, synthetic resins such, for example, as a phenolic condensate product. Although resins of this type are hard and stable in cured condition, they are nevertheless resilient and slightly compressible and will lend themselves to the formation of the sections 22 and 24 of the casing head and bushing sections 42, said sections embodying the principles of the present invention described above and particularly the slightly smaller diameter of the hole 34 and interior of the bushing than the pipe to be received therein. When said sections are formed from such resinous material, the molded surfaces will of course be smoother as distinguished from the surfaces provided by a sand mold. However, when the sections 22 and 24 and bushing sections are formed from such resin, said sections readily will accommodate and admirably be suited to clamp slightly compressible plastic pipe having a slightly larger diameter than that of the hole 34 and bushing interior, particularly when such pipe is of the polyethylene type described above. Nevertheless, metal pipe also may be clamped suitably by said sections 22 and 24 and bushing sections 42 when the same are formed from resin such as a phenolic condensate product or other hard and strong resinous materials, preferably of a thermosetting nature. It will be understood however, that other resins, affording suitable strength and rigidity may be used, even though they may be thermoplastic.

The foregoing description has been of an exemplary nature in regard to the various specific embodiments of casing heads employing the principles of the present invention, although said description has been specifically in regard to the embodiment in Fig. 3. These same principles are also employed in the specific embodiment of casing head shown in Fig. 2, the principal difference between the embodiments in Figs. 2 and 3 being that the former is provided with a slightly different form of boss provided with a plurality of holes 44 and 46, the axes of which are parallel to each other and are also substantially parallel to the axis of the well casing 10 when the head 20 is mounted in operative position thereon. In Fig. 2, the boss 48 on each of the sections 22 and 24 of the head are slightly larger than the bosses 30 illustrated in Fig. 3. Further, the bosses 48 in Fig. 2 are provided with axially aligned holes extending transversely therethrough for purposes of receiving a single bolt 49 disposed between the two holes 44 and 46. In the casing head shown in Fig. 2, the holes 44 and 46 preferably are of different diameters so as to accommodate well pipes of different diameters such, for example, as the pipes 50 and 52 illustrated in Fig. 8. Said pipes 50 and 52 by way of specific example, may respectively have diameters of 1" and 1¼". However, if desired for example, the holes 44 and 46 respectively may accommodate pipes having diameters of 1" and 1½". By the use of suitable bushings 40, one or both of these holes 44 and 46 may be rendered capable of accommodating pipes of smaller diameters than that for which the hole or holes are formed to receive without the use of a bushing, in accordance with the description set forth above in regard to the specific embodiment shown in Fig. 3.

It will be understood of course that the embodiment of casing head shown in Fig. 2 may be formed of any of the materials described above in relation to the embodiment shown in Fig. 3, the sections 22 and 24 of said head also being formed by either molding or casting as described in regard to the embodiment shown in Fig. 3.

Referring further to the embodiment shown in Fig. 2 and also Fig. 8, if it is desired to use well pipes 50 and 52 of the same diameter within a well casing, the hole 44, for example, may be provided with a bushing 40 of suitable size to accommodate a smaller diameter pipe 50 than that for which the hole 44 is intended.

In some well installations, the casing head or cap 20 may be attached to the upper end of a well casing 10 in the manner illustrated in Fig. 4. That is, the inner diameter of the flange 28 is preferably slightly larger than the outer diameter of the well casing 10 so that the flange 28 readily may be positioned around the upper end of the casing 10, particularly to position the head and pipes relative to the well casing. Thus, when the bolt 49 is tightened to clamp the sections 22 and 24 in operative position relative to the pipes disposed in the holes of the casing head, the flange 28 of the casing head will simultaneously be brought into the operative position thereof relative to the well casing 10 as illustrated in Fig. 4. From this illustration, it will be understood that the casing head 10 rests preferably by gravity upon the top of the well casing 10, the weight of the pipe 52 serving firmly to hold the casing head 20 in operative position on said well casing, said head also accurately positioning and maintaining the well pipe relative to the pump 14.

In certain installations of wells, it sometimes is desired to provide a tight seal between the casing head 20 and the upper end of the well casing 10. To facilitate the formation of such a seal, the present invention also contemplates the use of a sealing gasket 54 which is annular and, in cross-section, is U-shaped as illustrated in Fig. 5. The gasket 54 is formed preferably of some readily compressible material such as rubber and suitable space is provided between the flange 28 of the casing head 20 and well casing 10 to accommodate the gasket. However, the gasket 54 preferably has a thickness which normally is greater than said space. Thus, when the bolt 49 is tightened to clamp the well pipes within the holes 44 and 46 or any bushings which may be mounted therein, such tightening simultaneously will compress the outer flange of the gasket 54 between the flange 28 on the casing head and the upper end of the well casing. The same applies to the casing head illustrated in Fig. 3 relative to the well casing 10.

The gasket 54 also is capable of another function and that is to cover the roughened upper end of the casing 10 resulting from torch cutting and thereby prevent any well pipes from contacting said rough end of the well casing, especially when the well pipes are formed from plastic material.

In Fig. 6, another form of gasket 56 is provided, the same being annular but, in cross-section, is L-shaped rather an U-shaped as is the gasket 54 shown in Fig. 5. It is also to be understood that the gaskets 54 and 56 may be of sufficient thickness and compressibility that they may be used on the upper ends of well casings of a range of different diameters varying possibly as much as ½" to 1". For example, a specified casing head 20 may be made primarily for use with a 6" well casing, although said casing head could accommodate a smaller diameter well casing. It is feasible to provide a limited number of gaskets of different diameters and thicknesses which may be kept in stock by a supply house or plumber and a suitable gasket may be selected to be used so as effectively to seal a casing head 20 when used either with a well casing pipe with which it normally is intended to be used or with a well casing of smaller diameter.

Certain installations of wells also include a pump 58 which is submerged within the head of water 60 within the well casing 10. A well pipe 18 such as shown in Fig. 9 is connected with the upper end of pump 58. Usually, pumps of this nature are provided with an electric motor which is sealed within the pump casing and a marine-type cable 62 extends from the pump 58 to a source of current at ground level. An exemplary lead wire 64 is illustrated in Fig. 9 which is to be connected to such source of current. Either the cable 62 or lead wire 64 may extend through a suitable opening 66 provided in the casing head 20 as shown in Figs. 7 and 9. Further, the casing head 20 also may be provided with an additional opening 68 to permit the insertion of a tube 70 into the well for purposes of introducing purifying gas or fluid where installations require such purification.

From the foregoing, it will be seen that the present invention provides several embodiments of combined well casing heads or caps and pipe clamps composed of a plurality of cooperating and complementary sections which preferably are identical so as inexpensively to be manufactured individually by casting or molding the same in a single mold. One or more holes are formed in the casing head to accommodate a desired number of well pipes and the holes are slightly smaller in diameter than the outer diameter of the pipe or pipes to be accommodated by the casing head. Thus, regardless of whether metal or plastic well pipe is used, the several sections comprising the casing head may be secured together in operative position by simple bolt means and such securing simultaneously clamps the pipe or pipes relative to the casing head without need of any additional clamping or locking means.

In order to maintain the required inventory of different sizes of casing heads or caps to a minimum, the present invention also contemplates the use of adaptor bushings which may be inserted in the holes of the casing head to render the same capable of accommodating pipes of a diameter smaller than that for which the holes are primarily intended. Compressible gaskets of several different forms also may be used between the casing head and the upper end of a well casing so as to effect a seal between the casing head and the well casing, said gaskets preferably simultaneously being compressed incident to the sections of the casing head being secured together for purposes of clamping one or more pipes securely in fixed relation relative to the casing head and well casing, as well as the pump. Such gaskets also afford protection against damage of the well pipes by any roughness on the upper end of the well casing while said pipes are being mounted in operative position within the well casing. The several sections of which each casing head or cap is formed also require a minimum of finishing operations and, in general, the only machining, grinding, or buffing which is necessary when the head sections are cast from metal is on the surfaces which abut each other along the radially extending dividing line 32 illustrated in the various figures.

While all of the embodiments of casing heads illustrated and described herein are shown to comprise semi-circular sections which are complementary to each other to form a substantially circular casing head or cap, it is to be understood that, particularly if more than two pipes are to be accommodated for example, the casing head 20 may be formed of more than two segmental sections and appropriate bolt means may be provided to clamp said sections into a unitary assembly. Further, while the invention also has been illustrated in conjunction with cylindrical well casing and cylindrical pipes, it is to be understood that the principles of the invention may be applied to casing heads arranged to accommodate well casings or pipes of other geometrical cross-sections than cylindrical, all within the purview of the present invention.

While the invention has been shown and illustrated in its several preferred embodiments, and has included certain details, it should be understood that the invention is not to be limited to the precise details herein illustrated and described since the same may be carried out in other ways falling within the scope of the invention as claimed.

I claim:

1. The combination of a well casing and a composite casing head and pipe clamp positionable on the upper end of said well casing, said casing head comprising a disc-like cover extending transversely across said upper end of said casing, a cylindrical flange extending downwardly from the periphery thereof in slightly spaced relationship to the exterior of said well casing, and a cylindrically apertured and transversely extending boss projecting upwardly from the upper face of said cover; said cover being divided radially along said boss into a plurality of similar and separable molded sections complementarily connectable to each other to form a casing head unit, the sections of said head unit each having substantially flat and smooth abutting walls and a semi-cylindrical concavity in each section, the concavities of said complementary sections cooperating to form said cylindrical aperture extending through said boss, a well pipe having a slightly compressible outer surface extending through said opening in said head unit and into said well casing, said well pipe having an outer diameter of the range between .005" and .008" greater than that of said aperture in the boss of said casing head unit and the length of said aperture being substantially greater than the thickness of said disc-like cover to provide substantial gripping area to engage said well pipe, bolt means extending transversely through the sections of said boss on said casing head sections to secure said sections together with the abutting walls thereof in substantially tight engagement with each other and also securely clamping said well pipe by friction and compression within said aperture in said casing head unit without injury to said pipe when said sections are so secured together, and a compressible annular gasket extending around the exterior of said upper end of said well casing and over the upper end thereof and engaged by said flange and inner surface of said casing head unit to compress said gasket incidentally to such clamping of said well pipe, whereby said casing head unit simultaneously forms a tight clamped connection between said well pipe and well casing.

2. The combination of a well casing and a casing head unit positionable on the upper end of said well casing, said casing head comprising a disc-like cover having a transversely elongated boss projecting upwardly therefrom and said casing head being divided radially along said boss into a plurality of similar connectable molded sections having abutting faces extending substantially radially from the axis of said casing and vertically a distance greater than the thickness of said cover, said sections each having a plurality of semi-cylindrical cavities in said abutting faces thereof and the cavities in said sections respectively cooperating to form a plurality of parallel cylindrical openings through the boss and disc-like cover of said head unit, a molded split bushing mounted within one of said openings in said head unit and having an outer diameter of the order of between .002" and .004" greater than that of said one opening and forced into firmly clamped engagement therewith incident to connecting said head sections together, well pipes extending through said bushing and other opening in said head unit, said pipes having a slightly compressible outer surface and outer diameters respectively of the order of between .005" and .008" greater than that of the inner diameter of said bushing and the other opening in said head unit, and bolt means extending transversely through said boss sections of said casing head between said openings therein and operable to secure the sections thereof together and securely clamp said pipes by compression within said bushing and another opening and also clamp said bushing within said one opening in said casing head when said sections are secured together by said bolt means with the abutting faces of said sections substantially in tight contact.

References Cited in the file of this patent
UNITED STATES PATENTS

| | | |
|---|---|---|
| Re. 16,018 | Canfield | Mar. 10, 1925 |
| 376,609 | Rankin | Jan. 17, 1888 |
| 713,537 | Treadwell | Nov. 11, 1902 |
| 1,348,667 | Snyder | Aug. 3, 1920 |
| 1,519,457 | Judson | Dec. 16, 1924 |
| 1,579,648 | Crickmer | Apr. 6, 1926 |
| 1,646,639 | Crowell | Oct. 25, 1927 |
| 2,131,183 | Key | Sept. 27, 1938 |
| 2,358,367 | Van Meerbeke | Sept. 19, 1944 |
| 2,537,205 | Burmeister | Jan. 9, 1951 |